(12) United States Patent
Renkl (10) Patent No.: US 11,104,039 B2
(45) Date of Patent: Aug. 31, 2021

(54) MELTING DEVICE AND METHOD FOR MELTING MELTABLE PLASTIC MATERIAL, METHOD FOR MIXING REACTIVE PLASTIC COMPONENTS

(71) Applicant: KraussMaffei Technologies GmbH, Munich (DE)

(72) Inventor: Josef Renkl, Markt Indersdorf (DE)

(73) Assignee: KRAUSSMAFFEI TECHNOLOGIES GMBH, Munich (DE)

(*) Notice: Subject to any disclaimer, the term of this patent is extended or adjusted under 35 U.S.C. 154(b) by 0 days.

(21) Appl. No.: 16/534,748

(22) Filed: Aug. 7, 2019

(65) Prior Publication Data

US 2019/0358857 A1     Nov. 28, 2019

Related U.S. Application Data

(62) Division of application No. 15/735,506, filed as application No. PCT/EP2016/061767 on May 25, 2016, now abandoned.

(30) Foreign Application Priority Data

Jun. 18, 2015 (DE) ..................... 10 2015 109 770.2

(51) Int. Cl.
*B29B 13/02* (2006.01)
*B29B 7/76* (2006.01)
(Continued)

(52) U.S. Cl.
CPC .......... *B29B 13/022* (2013.01); *B29B 7/7615* (2013.01); *B29B 7/7631* (2013.01); *B29B 7/7663* (2013.01); *B29B 7/7673* (2013.01); *B29B 7/7684* (2013.01); *B29B 7/823* (2013.01); *B29C 39/24* (2013.01); *B29C 67/246* (2013.01); *B29K 2077/00* (2013.01); *B29K 2105/0002* (2013.01); *B29K 2105/0067* (2013.01)

(58) Field of Classification Search
CPC ............................ B01F 5/0077; B29B 13/022
USPC ................................ 126/343.5 A; 366/162.4
See application file for complete search history.

(56) References Cited

U.S. PATENT DOCUMENTS

| | | | |
|---|---|---|---|
| 180,688 A * | 8/1876 | Whitaker | C10C 3/12 126/343.5 A |
| 2,217,743 A | 10/1940 | Hallock-Greenewalt | |

(Continued)

FOREIGN PATENT DOCUMENTS

| | | |
|---|---|---|
| DE | 24 32 556 | 1/1976 |
| DE | 88 06 521.9 | 8/1988 |

(Continued)

*Primary Examiner* — David L Sorkin
(74) *Attorney, Agent, or Firm* — Henry M. Feiereisen LLC (57) ABSTRACT

A melting device includes a container capable of melting a material supplied in a free-flowing state and storing the material in a liquid state. The container includes a first storage section for storing the material in the free-flowing state, a second storage section for storing the material in the liquid state, and a dividing section provided between the first storage section and the second storage section and configured to hold back the material, when the material is in a non-molten or free-flowing state and to allow passage of the material from the first storage section into the second storage section, when the material is in a molten or liquid state.

14 Claims, 6 Drawing Sheets

(51) Int. Cl.
  *B29B 7/82*   (2006.01)
  *B29C 67/24*  (2006.01)
  *B29C 39/24*  (2006.01)
  *B29K 105/00*     (2006.01)
  *B29K 77/00*      (2006.01)

(56) References Cited

U.S. PATENT DOCUMENTS

| | | | |
|---|---|---|---|
| 2,374,069 A | | 4/1945 | Balthis |
| 3,964,645 A | * | 6/1976 | Scholl .................. B29B 13/022 |
| | | | 222/146.5 |
| 5,332,125 A | | 7/1994 | Schmitkons et al. |
| 5,523,537 A | | 6/1996 | Johannes et al. |
| 2004/0080064 A1 | * | 4/2004 | MacPhee ................ B29C 48/55 |
| | | | 264/40.1 |
| 2007/0080157 A1 | | 4/2007 | Mehaffy et al. |

FOREIGN PATENT DOCUMENTS

| | | |
|---|---|---|
| DE | 691 13 606 | 3/1996 |
| DE | 692 10 197 | 10/1996 |
| DE | 102006017808 | 3/2007 |
| EP | 2 572 851 | 3/2013 |
| GB | 1 249 217 | 10/1971 |
| WO | WO 2015/082728 | 6/2015 |

\* cited by examiner

Fig. 6
State of the art

MELTING DEVICE AND METHOD FOR MELTING MELTABLE PLASTIC MATERIAL, METHOD FOR MIXING REACTIVE PLASTIC COMPONENTS

CROSS-REFERENCES TO RELATED APPLICATIONS

This application is a divisional of prior filed copending U.S. application Ser. No. 15/735,506, filed Dec. 11, 2017, the priority of which is hereby claimed under 35 U.S.C. § 120 and which is the U.S. National Stage of International Application No. PCT/EP2016/061767, filed May 25, 2016, which designated the United States and has been published as International Publication No. WO 2016/202541 and which claims the priority of German Patent Application, Serial No. 10 2015 109 770.2, filed Jun. 18, 2015, pursuant to 35 U.S.C. 119(a)-(d).

TECHNICAL FIELD

The present invention concerns a melting device for melting meltable plastics. Furthermore, the invention concerns an arrangement for mixing reactive plastic components with such a melting device.

STATE OF THE ART

In the field of manufacturing plastic parts, various plants and processes are known. Thus, for example, raw materials delivered by the raw material producers in the form of flakes, granules or powder can be melted in a plasticising screw and then directly injected into a cavity of a tool where they cool and harden. Alternatively, there are also plastic components which are mixed before the cavity or in the cavity where they react to form a plastic part. In the latter case the main components, for example caprolactam, will mostly be halved between two containers and a catalyst will be added in one container and an activator in the other container. A measured mixing of these premixes into a reactive molten mass is then carried out in a common mixing head.

Figure 6:
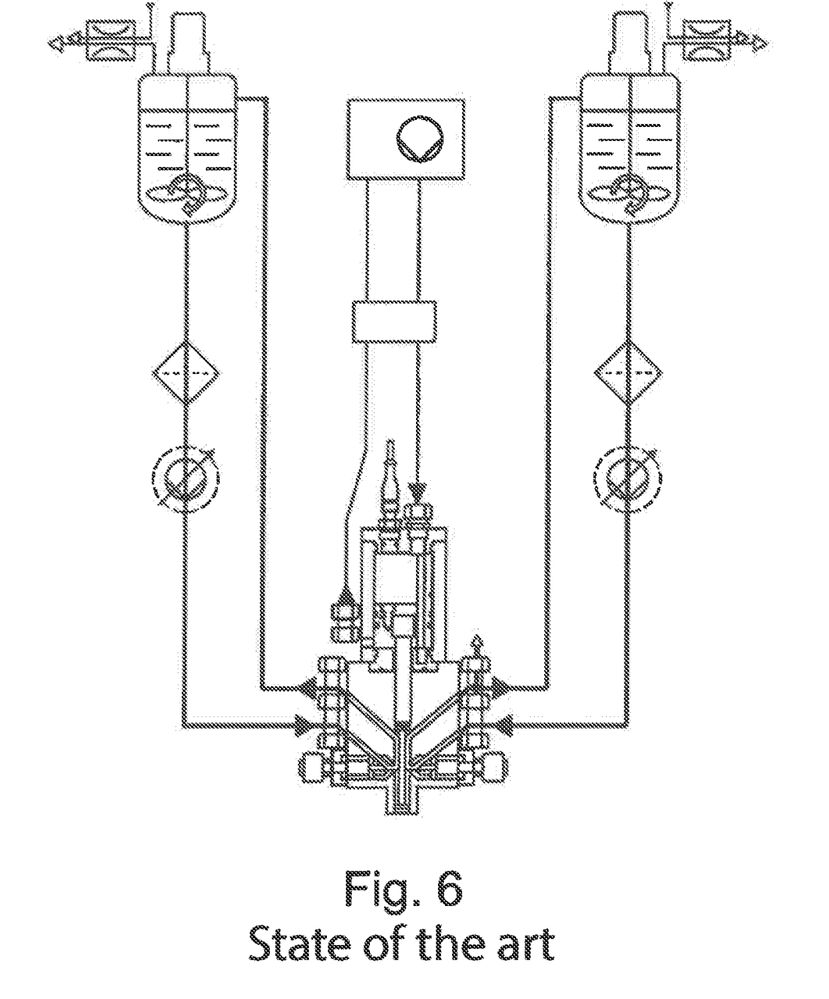
FIG. 6 shows a schematic depiction of a conventional mixing arrangement according to the state of the art.

The components must be liquefied for processing, in order to be able to measure, inject and apply them etc. In these known plants large containers known as day tanks are generally used, in which the at least two base components are melted and kept ready in a liquid state and are fed into the cavities by pumps (see FIG. 6). A disadvantage of this is that the individual components often remain in the large containers for long periods, whereby their quality and therefore their reactivity can decline. The plastic components provided with the catalyst in particular cause problems and make it necessary to process the materials quickly. The molten raw materials must therefore be processed completely within a prescribed period and the day tanks must be emptied before the next quantity of free-flowing material is fed in and melted. Furthermore, large quantities of the plastic components must be kept in a liquid state, or rather the day tank must be kept constantly "on the boil". The repeated preparing and melting of the plastic components takes a very long time, during which time the operation of the machine or the downstream treatment processes for plastic parts production are essentially idle. For this reason two or three-shift operation is not possible.

DISCLOSURE OF THE INVENTION

The task of the present invention is thus to make available a melting device and a method for mixing reactive plastic components, which makes possible a more flexible supply of plastic components in a molten or mixed state.

According to one aspect of the invention, the task is achieved by a melting device for meltable (plastic) materials, with the melting device having a container (or group of containers) in which meltable material, which is supplied in a free-flowing (e.g. granular, flaked or powdered or similar) state, can be melted and stored in a liquid state. Further, the container has a first storage section for storing the meltable material in its free-flowing state, a second storage section for storing the molten material in its liquid state and a dividing section provided between the first storage section and the second storage section. The dividing section is configured so that it holds back the material or plastic components in a non-molten or free-flowing state, and allows material in a molten or liquid state to pass from the first storage section into the second storage section.

Further advantageous developments are the respective subject matter of sub-claims.

The melting device for meltable (plastic) materials according to the invention has a container (or group of containers) in which meltable material, which is supplied in a free-flowing (e.g. granular, flaked or powdered or similar) state, can be melted and stored in a liquid state. Further, the container has a first storage section for storing the meltable material in its free-flowing state, a second storage section for storing the molten material in its liquid state and a dividing section provided between the first storage section and the second storage section. The dividing section is configured so that it holds back the material or plastic components in a non-molten or free-flowing state, and allows material in a molten or liquid state to pass from the first storage section into the second storage section.

The division of the container into two storage sections or chambers makes it possible to separate the plastic components in their two aggregate states, i.e. in the free-flowing state and the liquid state, from one another, or to functionally separate the melting of the material from the storage of the material in its liquid state. This means that the container does not first need to be emptied for the (renewed) melting of the material, rather, the melting of the material in the first chamber and the removal of the liquid material from the second chamber can occur in parallel. This makes possible a continuous operation which also allows a two, three or multi-shift operation.

The melting device according to the invention also makes possible a so-called stop-and-go-operation, since the structure of the melting device means that new material can be melted at any time without having to interrupt the downstream treatment processes and, therefore, only small quantities of molten material need to be present in the melting device at any one time. Thus the melting device can be emptied very quickly and at any time, and the whole machine can be stopped. The time required to start up the machine or melting device again is correspondingly short. Because of the small quantity in the second chamber, this is also processed correspondingly quickly so that no additional heating energy is required to maintain the molten material in a liquid state or to keep it "on the boil".

The disadvantages described above can therefore be avoided by means of the melting device according to the invention. Thus the long dwell times in the container are shortened, the melt quality is kept high and an on-demand provision of the plastic components is made possible. A further advantage is the fact that the melting device according to the invention can be realised with low investment costs.

The container is preferably formed as one piece and has two chambers. Alternatively, there may be a group of containers between which the dividing section is arranged.

According to one aspect of the invention the first storage section can be arranged vertically over the second storage section. The dividing section can be a grid with a mesh size, or a perforated plate with a hole diameter, smaller than the particle size of the material in its free-flowing state.

This has the advantage that molten material flows from the first storage section into the second storage section by itself or rather by gravity. In this way a control device for operating or opening and closing the dividing section, which can also be formed as a mechanically operated barrier, can be dispensed with.

According to one aspect of the invention, the first storage section and/or the dividing section can be provided with a heating device and be capable of being heated, in order, advantageously, to continuously melt the free-flowing, meltable material.

By appropriately controlling the heating device, a prescribed quantity of the free-flowing material can be briefly temporarily stored in the first storage section and melted as required. The integration of the heating device into the dividing section or dividing grid presents a technically very simple and economically beneficial solution. The melting process can in particular be continuous. In this case the control of the quantity of molten material can largely take place (with some time-lag) through the supply of the material to the first storage section.

Here, the grid or the perforated plate, if the dividing section is formed as such, and/or the storage section which forms the first storage section, can be capable of being heated. It is also an option for the whole container, i.e. both storage sections, to be capable of being heated, in order to prevent the temperature of the molten material in the second storage section from dropping too far, for example for a situation where the downstream treatment processes have to be briefly interrupted, for example for a tool change.

According to one aspect of the invention the melting device can further have a first supply and dispensing section for a measured, in particular continuous, supply of the meltable materials in a free-flowing state into the first storage section, and/or a second supply and dispensing section for a measured, in particular discontinuous, discharging of the molten material in a liquid state out of the second storage section.

Thus it is possible to adjust the quantity of plastic components in a free-flowing or liquid state using the supply and dispensing section, wherein the extraction of material out of the melting device can also occur discontinuously depending on the downstream treatment process. Thus the supply and the extraction of the material can be controlled independently of one another.

According to one aspect of the invention a fill-level measuring device can be provided which measures the fill-level of the material stored in a liquid state in the second storage section. Furthermore, a control device can be provided which controls the supply of the meltable material in a free flowing state by means of the first supply and dispensing section and/or the melting of the meltable material by means of the heating device in accordance with the measured fill-level.

In this way the quantity of stored liquid plastic components can be kept constantly the same or precisely adjusted. In doing so the control device can control the first supply and dispensing section and/or the heating device so that the quantity of liquid material in the second storage chamber corresponds to the immediate demand. The quantity can in particular be adjusted so that it is limited to a prescribed number of downstream plastics processing operations or so that it is processed within a prescribed time. Thus the quantity can be adapted for in the region of 2 to 10, in particular 4 to 8, preferably 5 plastics processing operations (shot). The dwell time in the second chamber can be set to a period of less than or equal to 30 minutes, in particular less than or equal to 15 minutes. In this way it is ensured that the molten material remains in a liquid aggregate state (preferably with a predetermined viscosity) even without any additional heating.

Another aspect of the invention is directed at a mixing arrangement for mixing reactive plastic components. This features a mixing chamber in which the reactive plastic components can be mixed with one another to form a reactive mixture, at least one melting device according to one of the preceding aspects and a second dispensing and/or supply device for a measured supply of at least the plastic components melted in the at least one melting device into the mixing chamber. The first dispensing and supply device and the second dispensing and supply device are, according to the invention, synchronised with one another so that only a prescribed quantity of meltable material is melted in the melting device, which quantity corresponds to the immediate demand for that plastic component, is preferably limited to a prescribed number of downstream plastics processing operations, in particular 2 to 10, preferably 5, or is to be processed within a prescribed time, in particular less than or equal to 30 minutes, preferably less than or equal to 15 minutes.

According to one aspect of the invention the mixing arrangement can feature a first melting device for melting a first reactive plastic component supplied in a free-flowing state with a first additive, in particular caprolactam, with an activator, and a second melting device for melting a second reactive plastic component supplied in a free-flowing state with a second additive, in particular caprolactam, with a catalyst.

In this way two reactive plastic components can be prepared or melted as required and mixed together and processed within a short time. The short dwell time of the reactive components in a liquid state maintains the quality and reactivity of the two reactive components. Thus the disadvantages mentioned in the introduction can be avoided by means of the melting device according to the invention. In particular in relation to the component mixed with the catalyst, swift processing following the melting can be ensured.

According to an alternative aspect of the invention the mixing arrangement can feature a first melting device for melting a (e.g. pure) plastic component, a third dispensing and supply device for the measured supply of a first additive, in particular an activator, to the mixing chamber and/or a fourth dispensing and supply device for the measured supply of a second additive, in particular a catalyst, to the mixing chamber. In the process, the supply of the plastic components and the additives by the second, third and/or fourth dispensing and supply devices can be synchronised with one another in relation to timing and quantities respectively (according to a formula) so that these and, where necessary, further components mix with one another into a desired reactive mixture.

Thus the melting device according to the invention may also be used in a single component arrangement in which plastic raw material is melted as required without additives and the additives are first mixed in directly in the mixing chamber.

A further aspect of the invention relates to a method for melting meltable plastics. This comprises the following steps: supplying meltable material which is in a free-flowing state to a first storage section of a melting device; melting the meltable material in the first storage section of a melting device; storing the molten material in a liquid state in a second storage section of the melting device; discharging the molten material from the melting device in a liquid state; and dividing the first storage section and the second storage section so that the material which is in a non-molten or free-flowing state, remains in the first storage section and can flow from the first storage section into the second storage section, preferably by itself, in a molten or liquid state.

A further aspect of the invention concerns a method for mixing reactive plastic components, with the following steps: the measured supply of each of the reactive plastic components in a free-flowing state to an appropriate melting device; melting the reactive plastic components in the respective melting device; the measured supply of the respective molten plastic components to the mixing chamber; mixing the molten plastic components with one another to form a reactive mixture in the mixing chamber; and coordinating the two supply steps with one another so that only a prescribed quantity of meltable material is melted in the melting device, which quantity corresponds to the immediate demand for that plastic component, is preferably limited to a prescribed number of downstream plastics processing operations, in particular 2 to 10, preferably 5, or is to be processed within a prescribed time, in particular less than or equal to 30 minutes, preferably less than or equal to 15 minutes.

Additional advantageous further developments of the invention are revealed in the following description of preferred embodiments.

BRIEF DESCRIPTION OF THE DRAWINGS

The present invention is described in more detail below by means of preferred embodiments with reference to the attached drawings.

DETAILED DESCRIPTION OF PREFERRED EMBODIMENTS

Figure 1:
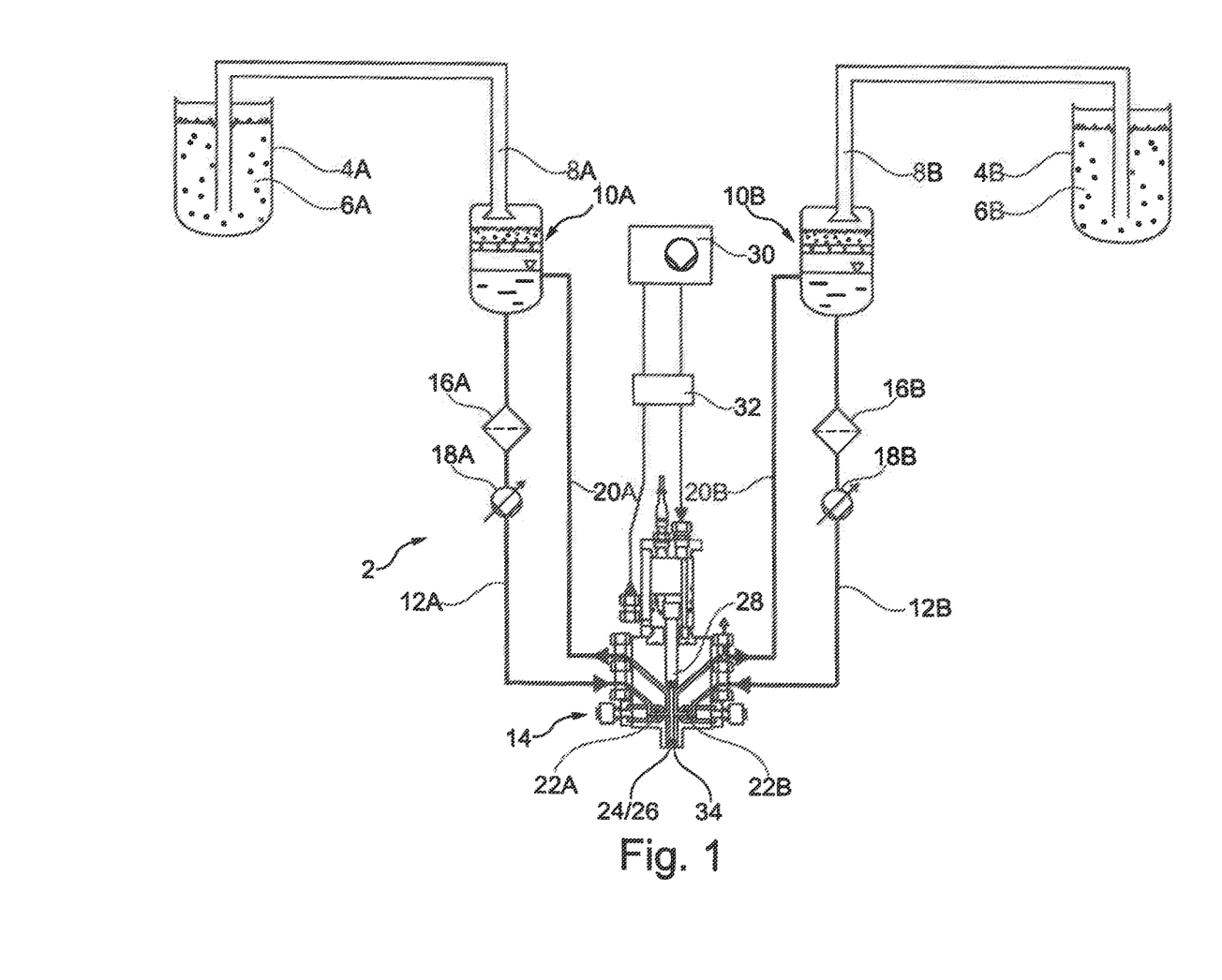
FIG. 1 shows a schematic depiction of a mixing arrangement according to a first embodiment of the invention.

FIG. 1 shows a mixing arrangement 2 for mixing liquid reactive plastic components according to a first embodiment. This serves to prepare the plastic components so that they can subsequently be used in downstream treatment processes for plastic parts production.

This mixing arrangement 2 features a first storage container 4A in which a first mixture 6A consisting of a first plastic component, e.g. caprolactam, together with a first additive, e.g. an activator, is stored. They are each in a free-flowing (e.g. granular, flaked, powdered or similar) form so that the plastic components do not as yet react with the respective additive and can be stored for longer in this form.

The two mixtures 6A and 6B are supplied to a first melting device 10A or a second melting device 10B by means of a first vacuum conveyor 8A and a second vacuum conveyor 8B (or any other suitable conveyor device). These melting devices 10A and 10B are structurally identical and their structure and manner of functioning are described in further detail below.

The mixture 6A liquefied by means of the first melting device 10A and the second mixture 6B liquefied by means of the second melting device 10B are supplied to a mixing head 14 via corresponding supply lines 12A and 12B. A filter 16A, 16B and a dispensing unit 18A, 18B or pump is provided in each of the supply lines 12A and 12B. Surplus material is directed or circulated from the mixing head 14 back into the respective melting device 10A or 10B via corresponding return lines 20A and 20B.

The respective mixture 6A and 6B is injected into a mixing chamber 24 via corresponding inlet nozzles 22A or 22B provided in the mixing head 14 and mixed together and the resulting reactive mixture 26 is conveyed into a mould cavity (not shown) via an outlet nozzle 34, by means of a piston 28 which is actuated by a hydraulic block 30 and controlled by a corresponding mixing head control unit 32.

Figure 2:
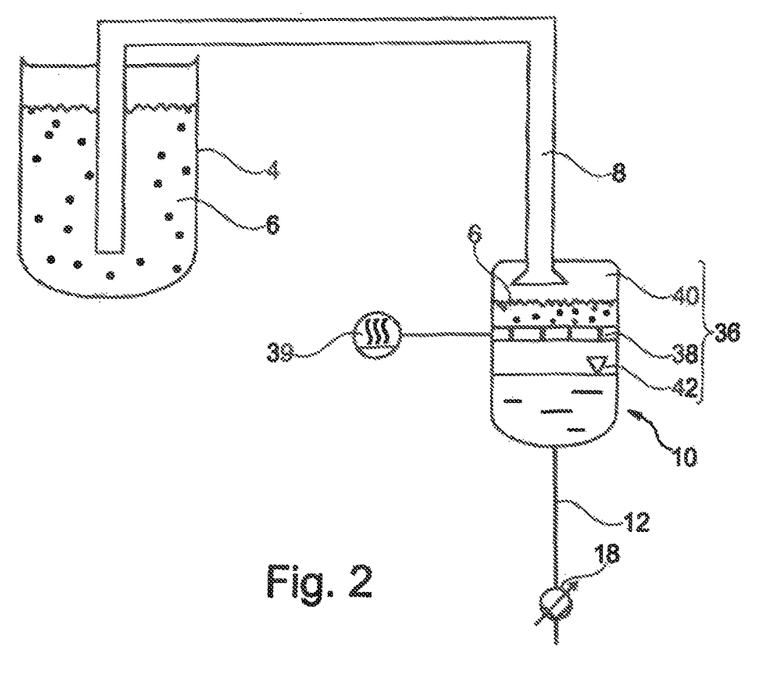
FIG. 2 shows a detailed view of a melting device according to the first embodiment of the invention.

FIG. 2 shows an enlarged depiction of the first melting device 10A. Since both melting devices 10A, 10b are structurally and functionally identical a common description of the melting device 10 follows.

The melting device 10 is essentially formed of a (e.g. one-piece) container 36 which is divided by a dividing grid 38 into a vertically upper first chamber 40 and a vertically lower second chamber 42. The base component mixture 6 is supplied to the first (upper) chamber 40 by the vacuum conveyor 8. The dividing grid 38 is configured so that, as long as it is in granular form, the supplied mixture 6 cannot fail or get through the dividing grid 38 into the second chamber 42. In other words, the mesh size of the dividing grid is smaller or finer than the particle size of the free-flowing starting mixture 6 supplied to the first chamber 4 and stored in the storage container 4.

The dividing grid 38 can be heated by a heating device 39 so that mixture 6 lying on the dividing grid 38 in the first chamber 40 can be melted or liquefied by means of the dividing grid 38. In a liquid form the molten mixture 6 can flow or drip through the dividing grid 38 into the second (lower) chamber 42 and subsequently get into the supply line 12.

The manner of functioning of the melting device is described below.

The container 36, or the two chambers 40, 42 are designed so that only the immediately required quantities of free-flowing base material or liquefied material 6 need to be kept available. Thus the first chamber 40 can accommodate preferably 10 to 20 kg of the granular mixture 6 and the second chamber 42 can accommodate molten material, which is just sufficient for a prescribed small number of plastics processing operations, e.g. maximum 5 shots, or for plastics processing operations within a prescribed time period, e.g. maximum 15 minutes.

In this way the necessary plastic components can be prepared on demand or according to a formula. In this way only small quantities of liquid base components are produced in each case which can be directly processed. Thus small quantities are melted, but this generally happens continuously.

The dispensing and supply device (vacuum conveyor 8) which supplies the free-flowing base mixture 6 to the first chamber 40 of the melting device 10, and the dispensing and supply device (dispensing unit 18) which removes the molten material 6 from the second chamber 42 of the melting device 10 are correspondingly synchronised with one another in relation to control or regulation technology, i.e. the vacuum conveyor 8A. 8B is controlled (via an integrated or central control device) so that it only supplies as much free-flowing plastic material 6 to the first chamber 40 as corresponds to the quantity of liquid plastic material that is extracted from the second chamber 42. The second chamber 42 only functions as a kind of short-term buffer in order to be able to even out potential fluctuations caused by the discontinuous demand in the downstream treatment processes. The melting process on the other hand can occur continuously.

Figure 3:
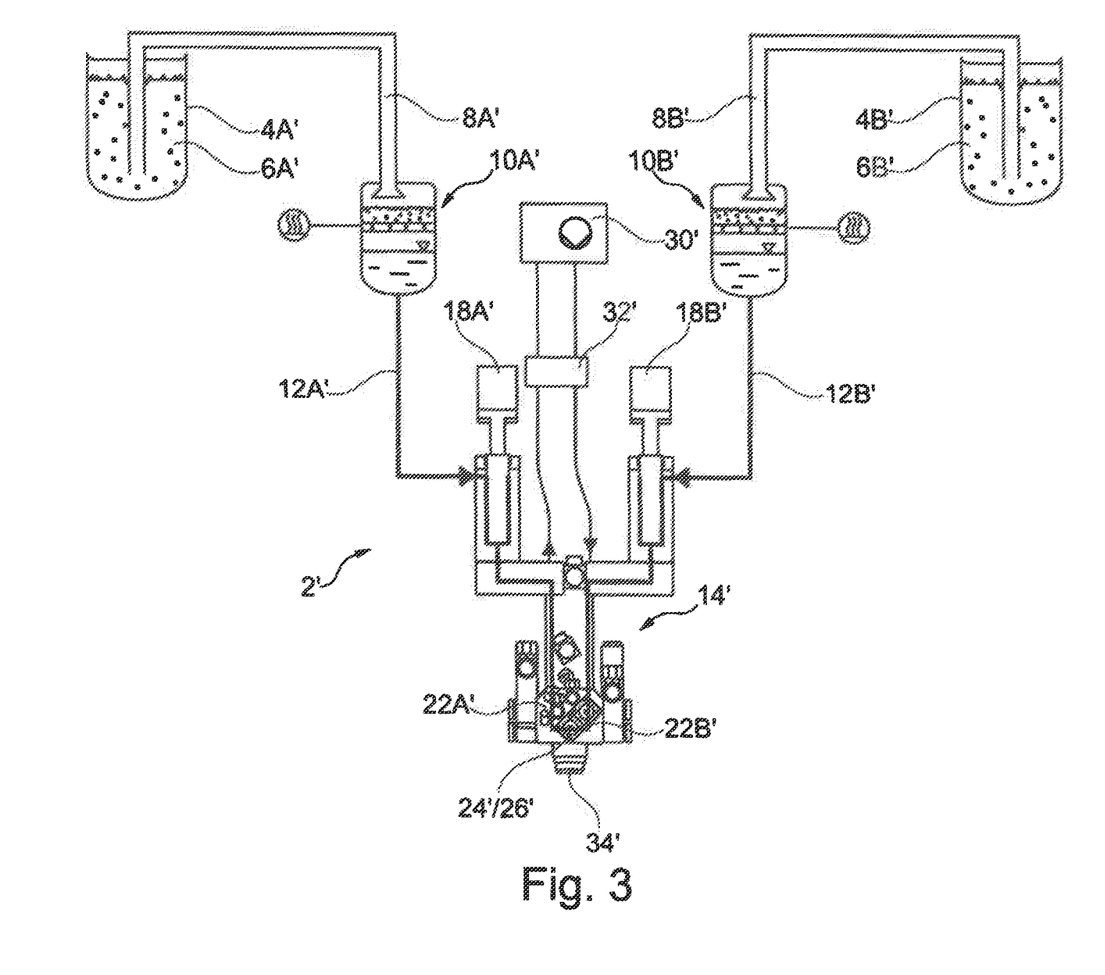
FIG. 3 shows a schematic depiction of a mixing arrangement according to the second embodiment of the invention.

FIG. 3 shows a functional diagram of a mixing arrangement 2' according to a second embodiment, which only differs from the first embodiment in relation to the structure of the mixing head 14' and the supply of the molten material to the mixing head 14'. Instead of the molten material being supplied and dispensed via pumps 18A and 18B, this is carried out via dispensing cylinders 18A' and 18B' which are arranged directly in front of or on the mixing head 14', are connected to the supply lines 12A' or 12B' and by which the quantities to be injected into the mixing chamber 24' may be precisely dispensed. The return fines 20A and 20B can thus be done without in this variant. The mixing head 24' has a correspondingly altered structure, but is functionally similar in relation to the first embodiment as described above.

Figure 4:
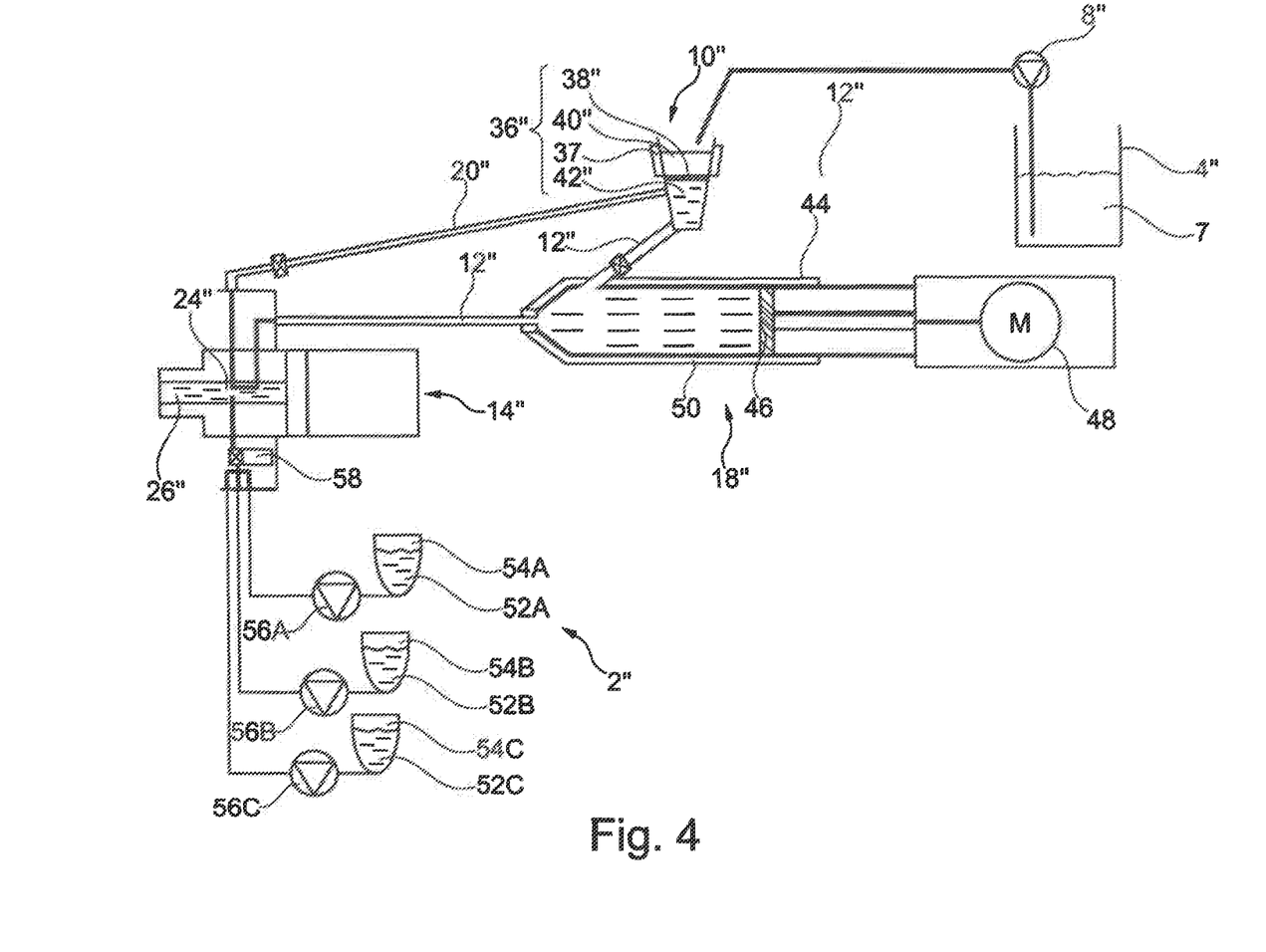
FIG. 4 shows a schematic depiction of a mixing arrangement according to the third embodiment of the invention.

FIG. 4 shows a functional diagram of a mixing arrangement 2" for mixing liquid, reactive plastic components according to a third embodiment. It is immediately obvious from FIG. 4 that in contrast to the first and second embodiments, one, two or a number of additives are not added at the beginning, i.e. before the melting process, but are instead first supplied directly to the mixing head 14" or the mixing chamber 24". With this in mind, only one storage container or repository 4" for the (pure or unmixed or additive-free) plastic components 7, e.g. caprolactam, is provided. The plastic components 7 can be stored there in a solid or free-flowing form (granular, flaked, powdered or similar form), or also in liquid form.

By means of a conveyor unit 8" (vacuum conveyor, pump or similar), the plastic components 7 are supplied to the melting device 10" or, more exactly stated, a first chamber 40". The melting device 10" has a funnel-shaped container 36" which in turn is divided by a dividing grid 38" into the vertical upper first chamber 40" and a vertical lower second chamber 42". The dividing grid 38" is configured so that the mixture supplied, as long as it is in a granular or very viscous liquid state, does not fail or get through the dividing grid 38" down into the second chamber 42". In other words, the mesh size of the dividing grid 38" is smaller or finer than the particle size of the free-flowing plastic components 7 stored in the storage container 4" and supplied to the first chamber 40", or the grid 38" holds the viscous material 7 back.

In contrast to the first and second embodiments, alternatively or in addition to the dividing grid 38", the first chamber 40" can be heated. Specifically, as shown in FIG. 4, the walls of the first chamber 40" can be provided with a heating strip 37, which can heat the walls of the first chamber 40" so that the plastic components 7 stored briefly in the first chamber 40" are melted and liquefy. In a molten or liquefied state, the plastic components 7 flow or drip through the dividing grid 38" into the second chamber 42" located below. An outlet opening in the floor of the second chamber 42" is connected with a dispensing unit 18" via a supply line 12" by means of which the liquefied plastic components 7 are supplied to a mixing head 14" or mixing chamber 24". A return line 20" feeds any surplus quantity of plastic components 7 back into the melting device 10", more exactly stated into the second chamber 42", or makes possible a circulation.

The dispensing unit 18" has a dispensing cylinder 44 and a dispensing piston 46 which is operable by a motor. The dispensing cylinder 44 can be designed to be capable of being heated and for this purpose is provided with a heating device 50, for example, built into the cylinder walls. In this way it can be ensured that the liquefied plastic components 7 do not coot down or change their viscosity. The liquefied plastic components 7 are supplied from the second chamber 42" of the melting device 10" into the dispensing cylinder 44 via a first section of the supply line 12" and by means of the dispensing piston 46 are supplied to the mixing chamber 24" under pressure via the second section of the supply line 12".

One, two three or a number of additives 52A, 52B, 52C are supplied to the mixing head 14", more exactly stated the mixing chamber 24", from the relevant containers 54A, 54B, 54C in which they are stored via respective conveyor units 56A, 56B, 56C so that they mix with the supplied liquefied plastic components 7 in the mixing chamber 24" to form a reactive mixture 28" which can be output by the mixing head 14" for further processing.

In relation to the additives, at least one activator and one catalyst may be involved, which initiate the chemical reaction of the caprolactam in the mixing head 14".

The precise dispensing of the additive may be carried out by the respective conveyor units 56A, 56B, 56C and/or by a control valve arrangement 58 provided in the mixing head 14".

Figure 5:
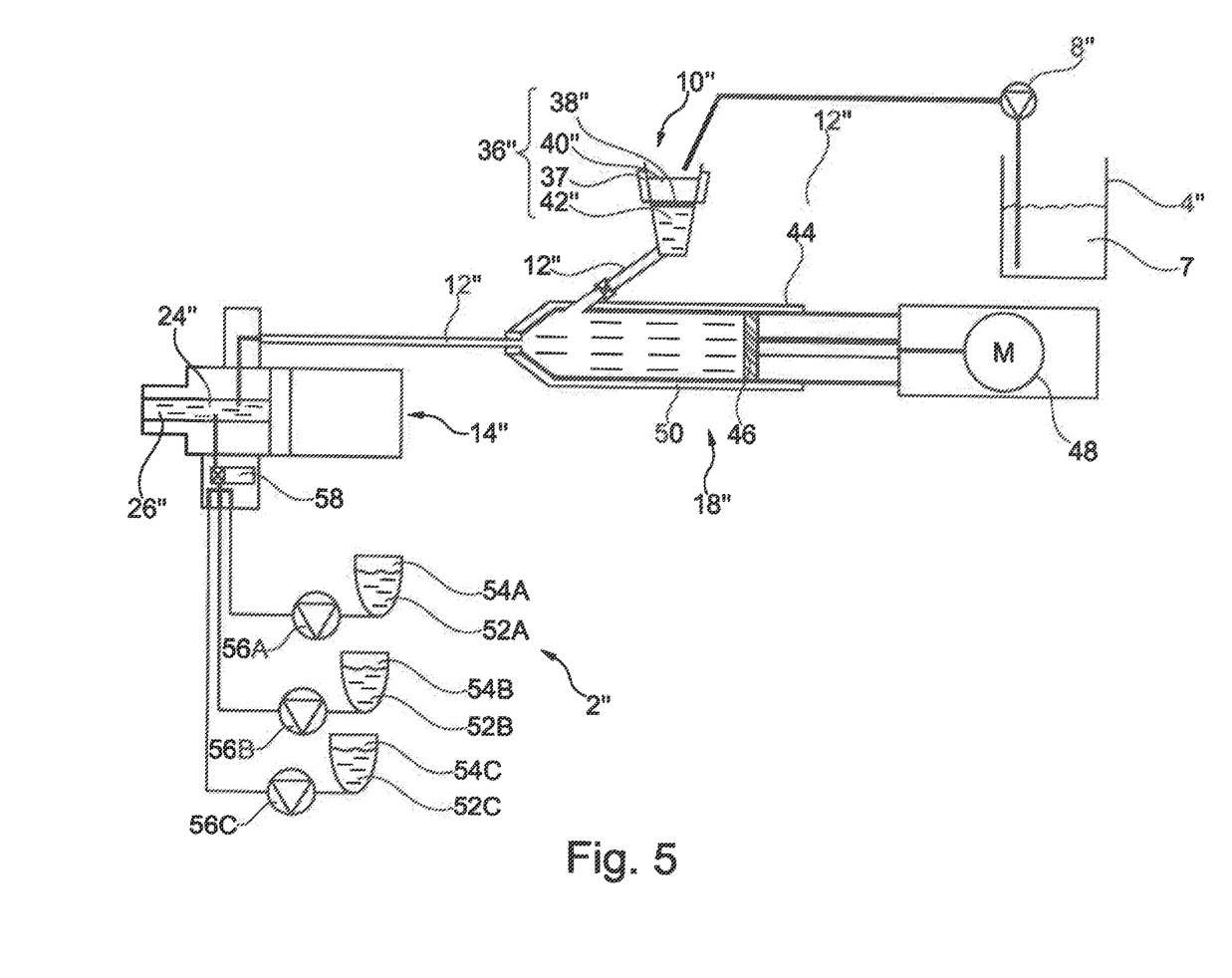
FIG. 5 shows a schematic depiction of a mixing arrangement according to a variation of the third embodiment of the invention.

FIG. 5 depicts a variation on the third embodiment which differs in that the supply of the plastic components 7 by means of the dispensing unit 18" occurs so that a circulation or return line 20" can be done without.

The invention has been described by means of preferred embodiments, but is not however limited to these.

Thus in a further developed form of the third embodiment, for example, the activator or the catalyst may already be mixed with the plastic components 7 in the storage container 4" and the other of the two additives first fed directly into the mixing chamber 24".

What is claimed is:

1. A mixing arrangement, comprising:
   a mixing chamber capable of mixing reactive plastic components into a reactive mixture;
   a first melting device comprising a container capable of melting one of the plastic components supplied in a free-flowing state and storing the one of the plastic components in a liquid state, said container comprising a first storage section for storing the one of the plastic components in the free-flowing state, a second storage section for storing the one of the plastic components in the liquid state, and a dividing section provided between the first storage section and the second storage section and configured to hold back the one of the plastic components, when the one of the plastic components is in a non-molten or free-flowing state and to allow passage of the one of the plastic components from the first storage section into the second storage section, when the one of the plastic components is in a molten or liquid state;
a first supply and dispensing section including a first vacuum conveyor for measured, continuous supply of the one of the plastic components in the free-flowing state to the first storage section; and
a second supply and dispensing section for measured, discontinuous discharge of the one of the plastic components from the second storage section to the mixing chamber,
wherein the first and second supply and dispensing sections are synchronised with one another so that only a prescribed quantity of the one of the plastic components is melted in the melting device, which quantity corresponds to an immediate demand for the one of the plastic components,
wherein the first storage section and the second storage section are formed as one piece.

2. The mixing arrangement of claim 1, wherein the quantity of the one of the plastic components is limited to 2 to 10 downstream plastics processing operations or limited to an amount sufficient for processing within less than or equal to 30 minutes.

3. The mixing arrangement of claim 1, further comprising a second melting device comprising a container capable of melting another one of the plastic components supplied in a free-flowing state and storing another one of the plastic components in a liquid state, said container of the second melting device comprising a first storage section for storing the other one of the plastic components in the free-flowing state, a second storage section for storing the other one of the plastic components in the liquid state, and a dividing section provided between the first storage section and the second storage section and configured to hold back the other one of the plastic components, when the other one of the plastic components is in a non-molten or free-flowing state and to allow passage of the other one of the plastic components from the first storage section into the second storage section, when the one of the plastic components is in a molten or liquid state.

4. The mixing arrangement of claim 3, wherein the one of the plastic components is caprolactam with an activator, and wherein the other one of the plastic components is caprolactam with a catalyst.

5. The mixing arrangement of claim 1, further comprising:
a third supply and dispensing device for a measured supply of an activator to the mixing chamber; and
a fourth supply and dispensing device for a measured supply of a catalyst to the mixing chamber,
wherein a supply of the one of the plastic components and the first and second additives by means of the second, third and fourth supply and dispensing devices are synchronised with one another as a function of time and quantity, so that the one of the plastic components and the activator and catalyst are mixed together in the mixing chamber to form the reactive mixture.

6. The mixing arrangement of claim 1, wherein the first storage section is arranged vertically above the second storage section, said dividing section configured as a grid defined by a mesh size which is smaller than a particle size of the one of the plastic components in the free-flowing state.

7. The mixing arrangement of claim 1, wherein the first storage section is arranged vertically above the second storage section, said dividing section configured as a perforated plate defined by a hole diameter which is smaller than a particle size of the one of the plastic components in the free-flowing state.

8. The mixing arrangement of claim 1, further comprising a heating device arranged to heat at least one of the first storage section and the dividing section so as to melt the one of the plastic components in the free-flowing state.

9. The mixing arrangement of claim 8, wherein the healing device operates continuously.

10. The mixing arrangement of claim 1, wherein the first supply and dispensing section is configured for measured supply of the material in the free-flowing state to the first storage section, and/or the second supply and dispensing section is configured for measured discharge of the material from the second storage section.

11. The mixing arrangement of claim 10, wherein the first supply and dispensing section operates continuously, and the second supply and dispensing section operates discontinuously.

12. The mixing arrangement of claim 8, further comprising:
a fill-level measuring device configured to measure a fill level of the one of the plastic components stored in the liquid state in the second storage section; and
a control device configured to control a supply of the one of the plastic components in the free-flowing state by means of the first supply and dispensing section and/or to control a melting of the one of the plastic components by means of the heating device, in response to the fill level measured by the fill-level measuring device.

13. The mixing arrangement of claim 12, wherein the control device controls operation of the first supply and dispensing section and/or the heating device so that a quantity of the one of the plastic components in the second storage section corresponds to the immediate demand.

14. The mixing arrangement of claim 1, wherein the one of the plastic components is caprolactam with an activator.

* * * * *